F. W. RIESENBERG.
WAGON SKEIN NUT LOCK.
APPLICATION FILED APR. 5, 1911.

1,009,858.

Patented Nov. 28, 1911.

WITNESSES:
John T. Schrott
Charles H. Wagner.

INVENTOR
F. W. Riesenberg.
BY Fred G. Dieterich
ATTORNEYS.

COLUMBIA PLANOGRAPH CO., WASHINGTON, D. C.

UNITED STATES PATENT OFFICE.

FRANK W. RIESENBERG, OF AUBURN, NEBRASKA.

WAGON-SKEIN NUT-LOCK.

1,009,858.

Specification of Letters Patent. Patented Nov. 28, 1911.

Application filed April 5, 1911. Serial No. 619,086.

*To all whom it may concern:*

Be it known that I, FRANK W. RIESENBERG, a citizen of the United States, residing at Auburn, in the county of Nemaha and State of Nebraska, have invented a new and Improved Wagon-Skein Nut-Lock, of which the following is a specification.

My present invention comprehends certain new and useful improvements in nut locks and it refers more particularly to that type of nut locking means more especially designed for use in connection with the locking nut that joins with the ordinary types of wagon axle skeins, and the said invention has for its object to provide such a nut locking device of a simple and inexpensive construction, that can be quickly applied for locking the axle nut in place and which effectively serves its intended purposes.

Figure 1:
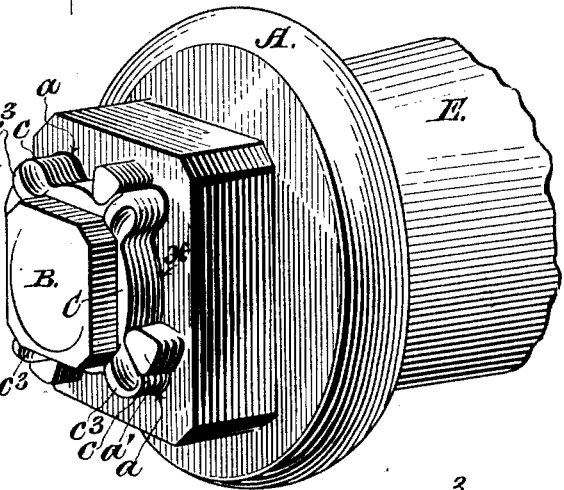
Figure 3:
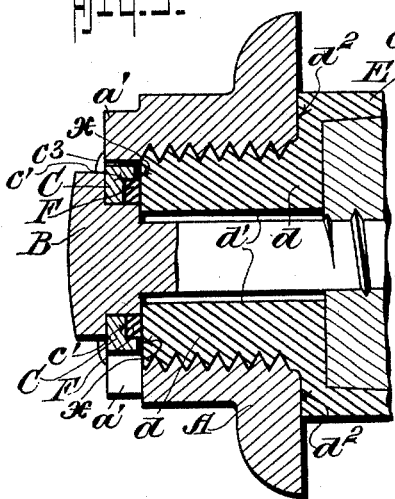
Figure 2:
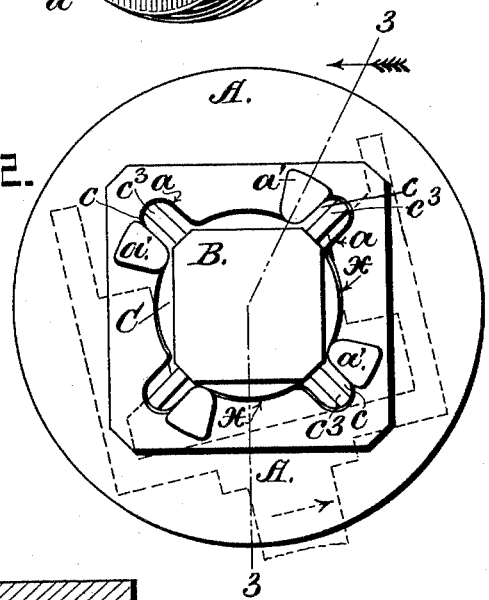
Figure 4:
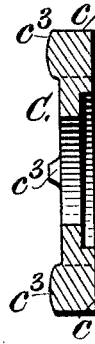
Figure 5:
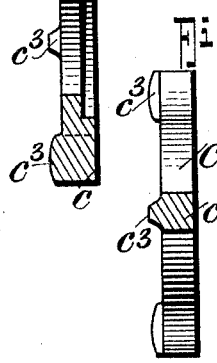
Figure 6:
Figure 7:
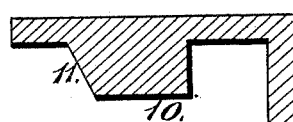

With other objects in view that will hereinafter appear, my present invention consists in the peculiar construction and novel arrangement of parts, hereinafter fully explained, specifically pointed out in the appended claims, and illustrated in the accompanying drawings, in which:

Figure 1, is a perspective view that shows my improved nut locking means applied to the ordinary wagon axle skein. Fig. 2, is a front elevation of the same. Fig. 3, is a longitudinal section thereof taken substantially on the line 3—3 on Fig. 2. Fig. 4, is a vertical section of the locking washer. Fig. 5, is an edge view thereof with one of the radial extensions or ears shown in cross section. Fig. 6, is an edge view of the tension device. Fig. 7, is a preferred form of an implement used for holding the washer and the nut as hereinafter referred to.

In the practical application of my invention I form the face of the ordinary wagon skein nut, indicated by A, with radially disposed grooves $a$, of which there may be two or four, the latter number being shown and arranged in pairs at right angles to each other, as is best shown in Fig. 2 of the drawings. I also provide the said outer face of the nut A with a series of radial lugs $a'$ cast with the nut, arranged one adjacent to each of the grooves $a$. The lugs $a'$ project outwardly from the nut, in practice, preferably one-fourth of an inch, see Fig. 3, that being also the thickness of a locking washer C which washer C coöperates with the nut and which has a series of radially projected fingers or lugs $c$ for engaging with the lugs $a'$ on the nut A, see Fig. 1. The outer faces of the lugs $a'$ are straight and not curved, as are the adjacent ends of the grooves $a$, the reason for which will presently appear.

B designates a lag screw which, when used in connection with the common wooden wagon axle, passes through a central bore $d'$ in the axle skein and into the end of the axle E. When the axle is of steel the member B is a metal screw bolt and screws into the axle skein. The head of the bolt B is square, and the neck portion adjacent the head is round to fit within the washer C. The washer C has an internal annular groove $c'$ for receiving a tension member F which, as shown, is a split spring ring that bears against the outer face of the axle skein, as is best shown in Fig. 3.

In adjusting the several parts to an operative condition the washer C is slipped onto the shank of the screw bolt B before the said bolt is screwed into the axle, it being obvious that when the bolt is screwed into the axle the washer C is forced up against the end of the skein, and the bolt and washer held from turning loosely, by the spring F.

The diameter of the washer C is slightly less than the opening in the nut A and the head of the bolt B is somewhat smaller than the washer, and by reason thereof in adjusting the parts to their operative condition, the nut A can be readily slipped over the washer and the bolt, by bringing its radial grooves into register with the radial lugs $c$, to bring its threaded portion into engagement with the threaded hub or extension of the axle skein. The nut A is then screwed onto the hub $d$, and as it turns, it carries the washer C around with it until the large or inner face of the said nut A abuts the shouldered end $d^2$ of the axle skein. When the nut A is screwed home against the skein E, a slight space, (see $x$, Figs. 1 and 3) is left between the outer face of the nut A and the inner face of the washer C, the latter now being entirely emerged from within the nut and the projections of the washer abutting the lugs $a'$ on the outer face of the nut.

In the practical application of my invention, assuming the nut A is being screwed onto the spindle until the washer C entirely emerges or clears the face of the nut, the said washer would remain stationary, but for the contact of the lugs $a'$ with the washer lugs $c$ which connection of the parts turns the washer with the nut until the back face of the nut engages the shoulder $d^2$ of the axle skein. As before stated, the correlation of the washer C and nut A is such that when the said nut A is screwed home, a space is left between the washer and the end of the nut which space varies in accordance with the character of the wagon on which my improvement is applied, and is sometimes as much as one-eighth of an inch. When the parts are screwed home, as stated, the washer lugs $c$ and the nut lugs $a'$ are in the relation shown in Fig. 2 and should the said nut A accidentally unscrew, by the backing of the wagon, or otherwise, the lugs $a'$ will recede from the lugs $c$. It will now be understood that the washer C is held stationary by the tension of the spring F until the nut lugs $a'$, as they turn backward, engage with the back faces of the next or adjacent lugs $c$ of the washer C, which then continue to turn with the nut until the outer face of the nut A, adjacent to the lugs $a'$, bears against the inner face of the lugs $c$ of the washer C, which then forms the locking means for preventing the nut from unscrewing further. After removing the nut A from the axle skein, which operation is effected by first slightly starting the nut back with a wrench and then holding the lugs $c$ against the lugs $a'$, by any suitable device, see for example, Figs. 1 and 3, or if not in that position, by simply tapping the lugs $c'$ back against the lugs $a'$ with a wrench until the two lugs come into the position shown in the said Figs. 1 and 3. By then unscrewing the nut and washer together until the lugs $c$ shall have entered the grooves $a$ of the nut, the nut and washer can be readily threaded off the bolt B. An ordinary wagon wrench may be used for turning off the nut A and any suitable device may be used for holding the washer from turning, while bringing the nut grooves and the washer lugs into register, such for example, as is shown in Fig. 7, which shows the said tool formed with a pair of oppositely disposed internal lugs 10—10, whose ends 11 and 12 are so shaped that the lugs 10 will fit between the opposite sets of lugs $c$ and $a$ (see dotted lines, Fig. 2) to hold the said washer C in position to allow the nut A to slide back over the said lugs $c$.

From the foregoing taken in connection with the drawings the complete construction, the manner in which the parts are adjustably connected and manipulated to bring them to a locking and unlocking position will be readily apparent.

What I claim is:—

1. In a nut lock of the character stated, the combination with the axle spindle; of a washer having stops, and a nut for engaging the spindle having portions for interlocking with the washer stops during a portion of the unscrewing movement of the nut and other portions for being engaged by the said stops when the said nut is screwed home, and means for holding the washer stops in frictional contact with the face of the nut at times.

2. In a nut lock, the combination with the axle spindle; of a nut for screwing onto the spindle, a locking washer for engaging the nut to turn with the said nut during a part of the unscrewing movement thereof, said washer having members that act as stops against the unscrewing of the nut when the nut is screwed home, and means for frictionally holding the said washer stops against the face of the nut at predetermined times.

3. The combination with the axle spindle, and the nut that engages the spindle, said nut having grooves of a washer that coöperates with the nut, said washer having stops to enter said grooves and cause said nut and washer to turn together while said nut is being screwed home, said stops also acting as locking members for holding the nut from turning back after the nut has been screwed home, and a means for removably holding the washer on the axle spindle.

4. In a nut lock, the combination with the axle having a threaded spindle; of a nut for engaging said spindle, said nut having an internal longitudinal groove and an external lug, a washer, a lag bolt that supports the washer and clamps it against the axle end, a tension device interposed between the washer and the spindle said washer having a lug for interlocking with the nut, as it is screwed on or off the axle and which acts as a clamp for engaging the external face on the nut after the latter is screwed home.

5. A wagon axle having a shouldered and threaded spindle, a nut for engaging the spindle and the shoulder, said nut having an internal longitudinal groove and having projections on its outer face, said washer having a radial lug for entering the groove of the nut to turn with the said nut as it is screwed home, and to engage with the projections on the face of the nut after the nut is screwed home, and means for frictionally holding the washer in engagement with the face of the nut when the latter is turned home.

6. An axle spindle, a nut threaded thereon, a washer movable through the nut as the nut is threaded onto the spindle, and means connecting said washer and nut to turn together as said washer moves relatively through said nut, and means on the face of said nut for engaging said washer after it has passed relatively through the nut to prevent said nut from unscrewing.

7. An axle spindle, a washer mounted on the end thereof and having projecting lugs, a nut threaded onto said spindle and having longitudinal grooves to pass over said washer projections, and means on the face of said nut coöperative with said lugs to hold the washer as an abutment for said nut to cause them to turn together and a spring tension device for frictionally holding said washer from free turning movement.

8. The combination with an axle skein having a threaded spindle, a lag bolt, a washer having a radial lug held by the lag bolt, and a spring interposed between the washer and the end of the axle skein spindle; of a nut for threading onto the said threaded spindle, said nut having a longitudinal internal groove for receiving the radial projection on the washer, a projection on the nut for engaging the washer lug to turn the said washer with the nut as the latter is screwed home, said washer lug forming a clamp for engaging the outer face of the nut when the latter is screwed home and clears the said washer lug.

9. In a nut lock of the character stated, the combination with the axle spindle; of a washer having a nut engaging member, a nut for engaging the spindle, said nut having a portion for interengaging the washer member during a part of the screwing and unscrewing movement of the nut, said nut engaging member when said nut has been screwed home adapted to lie out of register with the nut portion that engages the same during the screwing and unscrewing movement, to form a stop to restrain said nut from unscrewing, and means for holding said washer in position on the axle spindle.

10. The combination with the axle spindle, and the nut that engages the spindle, said nut having a groove, of a washer that coöperates with the nut, said washer having a stop to enter said groove and cause said nut and washer to turn together while said nut is being screwed home, said stop also acting to hold the nut from turning back after the nut has been screwed home, and means for holding the washer on the axle spindle.

11. In a nut lock, the combination with the axle spindle; of a nut for screwing on the spindle, a locking washer for engaging the nut to turn with the said nut during a part of the unscrewing movement thereof, said washer having at least one member that acts as a stop against the unscrewing of the nut when the nut is screwed home, and means for holding the washer stop member against the face of the nut at times.

12. The combination with the axle spindle, and the nut that engages the spindle, said nut having at least one groove, of a washer that coöperates with the nut, said washer having at least one stop to enter said groove and cause said nut and washer to turn together while said nut is being screwed home, said washer stop also acting to hold the nut from turning back after the nut has been screwed home, and means for holding the washer on the axle spindle.

FRANK W. RIESENBERG.

Witnesses:
C. H. SCHOCHT,
ELIZABETH TYNAN.

---

Copies of this patent may be obtained for five cents each, by addressing the "Commissioner of Patents, Washington, D. C."